United States Patent [19]

Wong

[11] Patent Number: 4,862,177

[45] Date of Patent: Aug. 29, 1989

[54] PROCESSOR FOR DISCRIMINATING BETWEEN GROUND AND AIRBORNE MOVING TARGETS

[75] Inventor: Sung Y. Wong, Tarzana, Calif.

[73] Assignee: Hughes Aircraft Company, Los Angeles, Calif.

[21] Appl. No.: 527,106

[22] Filed: Nov. 25, 1974

[51] Int. Cl.$^4$ .................... G01S 13/52; G01S 13/58
[52] U.S. Cl. .................................. 342/160; 342/95; 342/146; 342/149
[58] Field of Search ............ 343/7.7, 9; 342/95, 342/146, 149, 160

[56] References Cited

U.S. PATENT DOCUMENTS 3,787,851 1/1974 Hughes ........................ 343/7.7
3,914,763 10/1975 Green et al. ...................... 343/7.7

Primary Examiner—Thomas H. Tarcza
Assistant Examiner—Linda J. Wallace
Attorney, Agent, or Firm—Leonard A. Alkov

[57] ABSTRACT

A processor adapted for use in conjunction with a monopulse radar system for discriminating between ground and airborne moving targets and comprising: doppler filter circuits for detecting moving targets; angle measurement circuits which respond to the received sum and elevation difference signals so as to provide an indication of the relative angle of each moving target and of the ground; and means for identifying a detected target as a ground or an airborne target as a function of whether the angle of the target is substantially the same as or different from that of the ground.

13 Claims, No Drawings

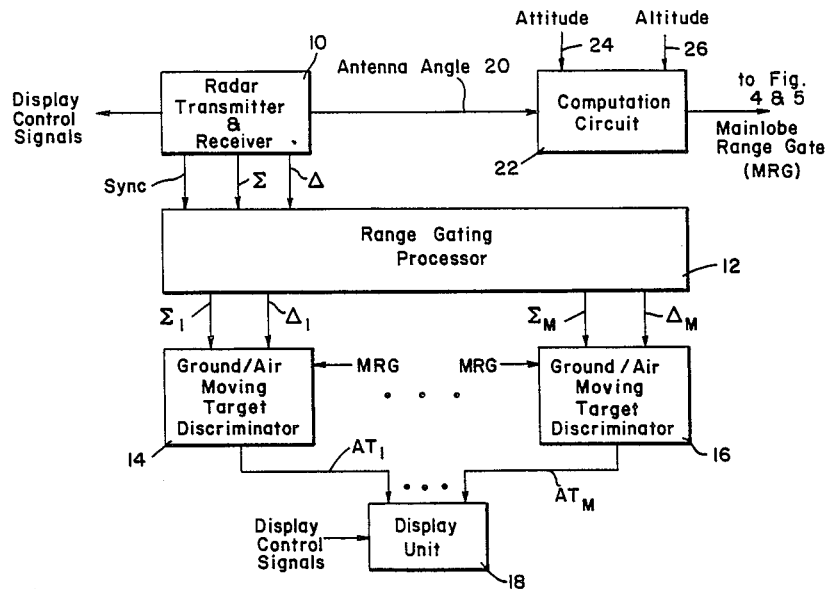

PROCESSOR FOR DISCRIMINATING BETWEEN GROUND AND AIRBORNE MOVING TARGETS

BACKGROUND OF THE INVENTION

This invention relates to radar processors which determine whether a target moves on or near the ground or in the air; and it is particularly adapted for use in conjunction with monopulse, doppler type radar systems.

In low and medium pulse repetition frequency (PRF) doppler radar systems (sometimes referred to as velocity ambiguous systems), targets having different velocities can produce identical received signal spectrums. For example, for a given such radar system an automobile moving at 50 knots might produce the same doppler signal spectrum as an aircraft traveling at 500 knots. Hence, radar detection of aircraft can be masked by automobile traffic on land or by surface crafts at sea.

Heretofore several techniques have been used to resolve the above described velocity ambiguity problem. For example, one prior method depends on determining the velocity of the target by observing (or tracking) the target from scan to scan. This requires implementation of a track-while-scan function which can be both complex and expensive to mechanize in reliable configurations. Another prior art approach to resolving the velocity ambiguity problem uses PRF sensitivity to determine whether or not the target's radial velocity is large or small and the slower targets are assumed to be ground targets. This latter technique sacrifices detection of airborne moving targets on or near the "beam" (cross-track targets); and by splitting the dwell time (time on target) on independent detections using two PRFs, an excessive amount of transmitter power is required. In either of the two above outlined approaches their implementation is far from simple.

SUMMARY OF THE INVENTION

It is therefore an object of the subject invention to provide an improved moving target detection system adapted for distinguishing airborne from ground moving targets.

It is another object of the invention to provide a relatively noncomplex processor for distinguishing airborne from ground moving targets and which is adaptable for use in conjunction with monopulse doppler radars of the type available on many modern aircrafts.

A further object is to provide an improved processor for distinguishing between ground and airborne moving targets; and which may be used in conjunction with prior art radar systems so as to further enhance the accuracy of the discrimination between airborne and ground moving targets.

In accordance with one preferred embodiment of the subject invention, received signals from the sum and elevation difference channels of a monopulse coherent radar are range gated and the resulting signals from each range gate interval are processed by banks of doppler filters. Detection of moving targets is sensed from the filtered sum signal; and the angle of the detected target is provided by an angle measuring arrangement which responds to both the filtered sum and filtered elevation difference signals. In accordance with one preferred embodiment of the subject invention, one pair of filters pass only the elevation difference and sum signals resulting from received clutter energy (ground returns) to an angle measurement unit which determines the elevation angle from the center (boresight) of the antenna beam to the ground. The measured angle for each of the detected moving targets is compared to the measured angle of the ground and if these angles are different the detected target is determined to be an airborne moving target; if they are the same the target is determined to be a ground moving target.

One herein illustrated embodiment of the invention uses a computer prediction of the range interval which encompasses the zone of interception of the transmitted beam with the ground to enable the detection system. This is to ensure that in the absence of ground returns the angle of the moving target will not be compared with an angle derived from noise.

One advantage of the subject invention is that it does not depend on the absolute calibration of the radar antenna pattern since it only requires the comparison of two antenna function values based on the same antenna pattern. An additional advantage of the subject invention is that it is adaptable for use with any coherent, or coherent on receive, low or medium PRF radar system; and in some systems the same angle measurement circuits which are primarily implemented for terrain following and terrain avoidance modes may be utilized in the implementation of the processor in accordance with the subject invention.

BRIEF DESCRIPTION OF THE DRAWINGS

The novel features of this invention, as well as the invention itself, will be best understood from the accompanying description taken in connection with the accompanying drawings in which like reference characters refer to like parts and in which.

DESCRIPTION OF THE PREFERRED EMBODIMENTS

Figure 1:
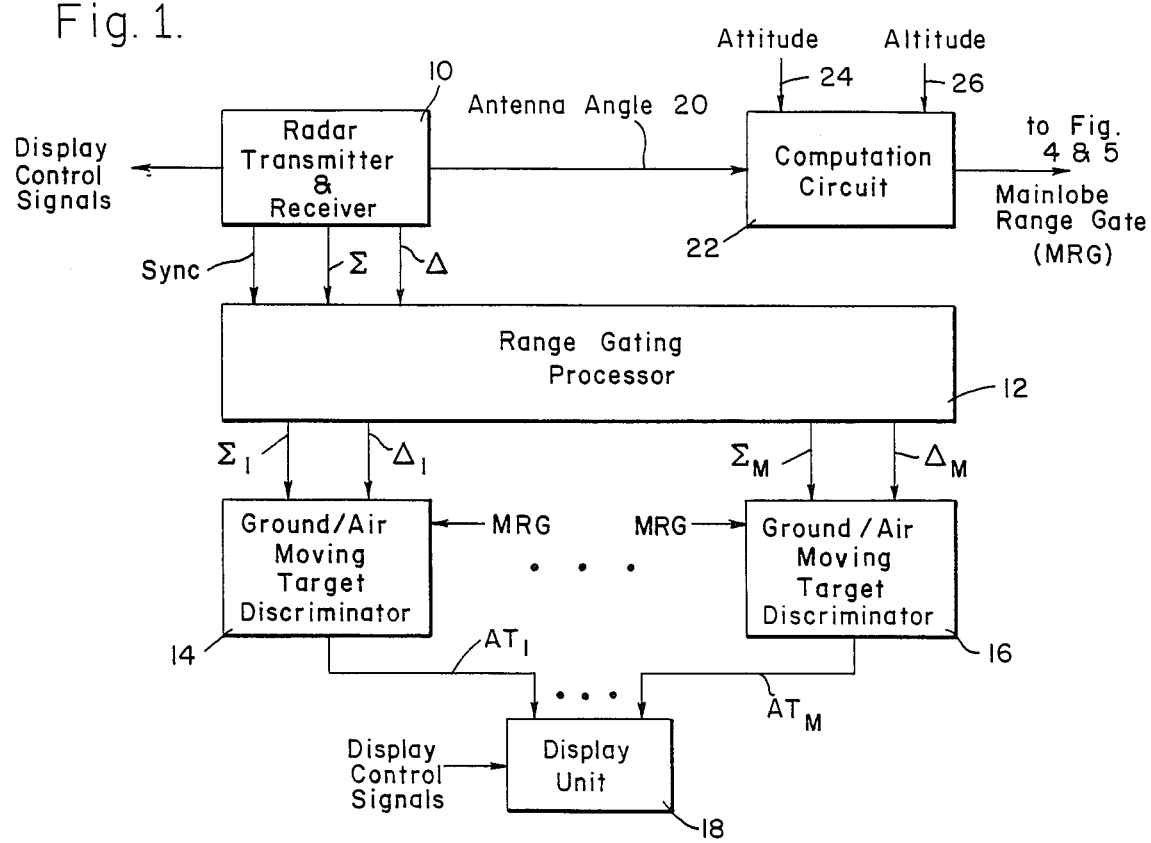
FIG. 1 is a block diagram of a monopulse radar system which incorporates a processor in accordance with the subject invention, for discriminating between ground and airborne moving targets.

Referring first to FIG. 1, a coherent monopulse radar transmitter and receiver system 10 applies the sum signal ($\Sigma$) and elevation difference signal ($\Delta$) to a range gating processor 12 wherein the portions of the signals which correspond to respective radar range intervals are gated to corresponding ground/air moving target discriminator units such as 14 and 16. For example, if the system of FIG. 1 were processing 400 range gate intervals there would be 400 processors such as units 14 and 16 operating in parallel. Each of these units are supplied with the received sum and elevation difference signals which correspond to their respective range interval. Hence, discriminator unit 14 receives the sum and elevation difference signals corresponding to range bin one and these signals are designated in FIG. 1 by the notation $\Sigma_1$ and $\Delta_1$ respectively. Similarly the received signals processed by discriminator unit 16 for range interval M are $\Sigma_M$ and $\Delta_M$.

As will be explained in detail hereinafter relative to FIG. 4, each of the discriminator units such as 14 and 16 process the applied signals originating from moving targets so as to distinguish between ground and airborne moving targets as a function of their respective angles within the radar antennas pattern. The angle measurement is performed as a function of the elevation difference and sum signals having the same doppler energy content as that of the detected moving target.

As also shown in FIG. 1 the output signals from each of the ground/air moving target discriminator units, such as 14 and 16, are applied in parallel to a display unit 18 and in the embodiment of FIG. 1, these signals are indicative of airborne moving targets. However, it will be readily understood that in accordance with the invention ground moving targets could have been selected for display. Display unit 18 is synchronized in response to display control signals supplied from radar system 10 in accordance with well known techniques.

The radar transmitter and receiver system 10 further provides an antenna elevation angle signal referred to the aircraft fuselage reference line, for example, which is applied on a lead 20 to a computation circuit 22. Computation circuit 22 is also provided with signals indicative of the attitude or angle of attack of the aircraft carrying the radar system as well as the altitude of the aircraft. The angle of attack signal and the altitude signal are applied on leads 24 and 26 respectively from aircraft navigational systems not shown. From the angle of attack signal which is referenced to the aircraft's fuselage reference line, for example, and from the antenna angle and altitude signals, computation circuit 22 computes (in accordance with well known techniques) the range interval for which the main lobe of the transmitted antenna pattern intersects the ground. In FIG. 1 this signal is designated as the main lobe range gate (MRG); and its function in the processor of the present invention will be described hereinafter relative to the FIG. 4.

Figure 3:
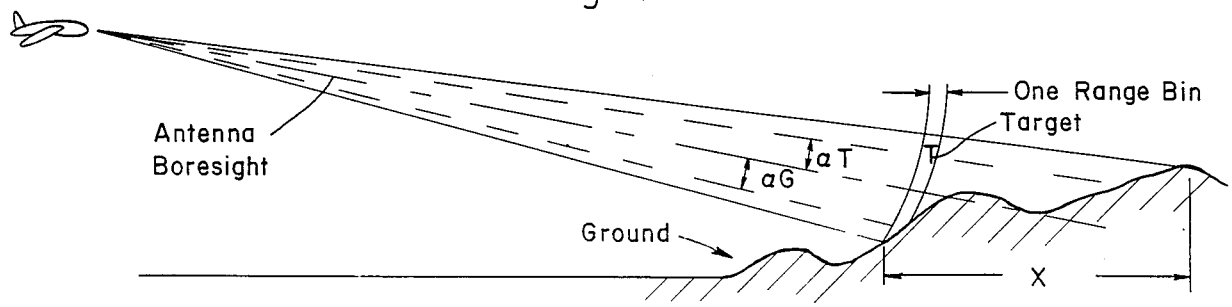
FIG. 3 illustrates the geometry associated with radar detection of airbourne and ground moving targets.

Before proceeding with a description of a preferred embodiment of the present invention, the underlying theory of the invention will now be briefly summarized with respect to FIG. 3. Unlike prior art systems which are based on velocity discrimination, the subject invention utilizes the fundamental property that ground moving targets move on the ground and air moving targets in the air; and therefore the present invention can also be used in conjunction with prior methods to further enhance the accuracy of discrimination between ground and airborne moving targets.

As shown in FIG. 3, for a given range bin an airborne moving target designated T has an elevation angle relative to the boresight line of the radar's antenna of $\alpha_T$; and the angle to the ground for the same range bin is $\alpha_G$. For the illustrated situation of an airborne moving target the two just mentioned angles are quite apparently different. Of course, for the ground moving target case by definition the target is perforced to move on the ground and $\alpha_T \approx \alpha_G$. Still referring to FIG. 3 the main lobe range enabling gate (MLG) would correspond to the range zone (designated X in FIG. 3) in which the antenna's main beam intercepts the ground. It is noted that the computation of this gate need not be very accurate; and as will be explained further hereinafter, the MLG gate is used to inure that erroneous processing does not occur in the absence of ground returns; and its implementation would not be required in all applications for the present invention.

With respect to the signal-to-noise requirements for processors of the subject invention an estimate of the angle separation of an airborne target at a low altitude of a thousand feet at 10 nautical miles yields an extended angle of about 1 degree between the target and the intersection of the beam's boresight with the ground. Even though the monopulse elevation difference signal is weak when a target is near boresight most monopulse radar systems are designed to track a target near boresight to a small fraction of a beam width and hence sufficient signal-to-noise ratio will be available to provide the angle measurement required by the present invention. Of course, when the target is off boresight by a substantial amount the difference signal is rather large and no signal-to-noise processing problem is encountered. Further, the received signals from the ground are quite large and no significant signal-to-noise problems in computing the angle to the intersection of the antenna beam and the ground are present.

Figure 2:
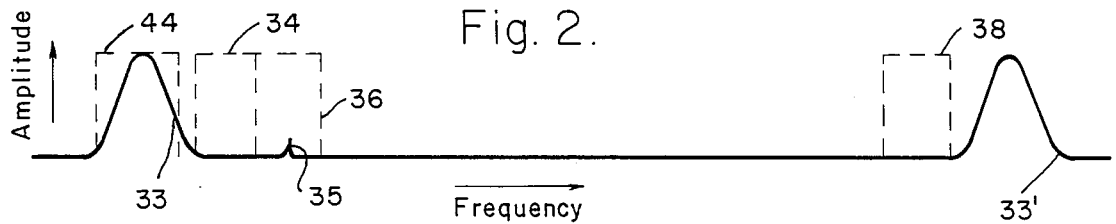
FIG. 2 is a waveform depicting a portion of the spectrum of the received signal of the radar system of FIG. 1, for explaining the implementation of the filters in the processor of FIG. 1.
Figure 4:
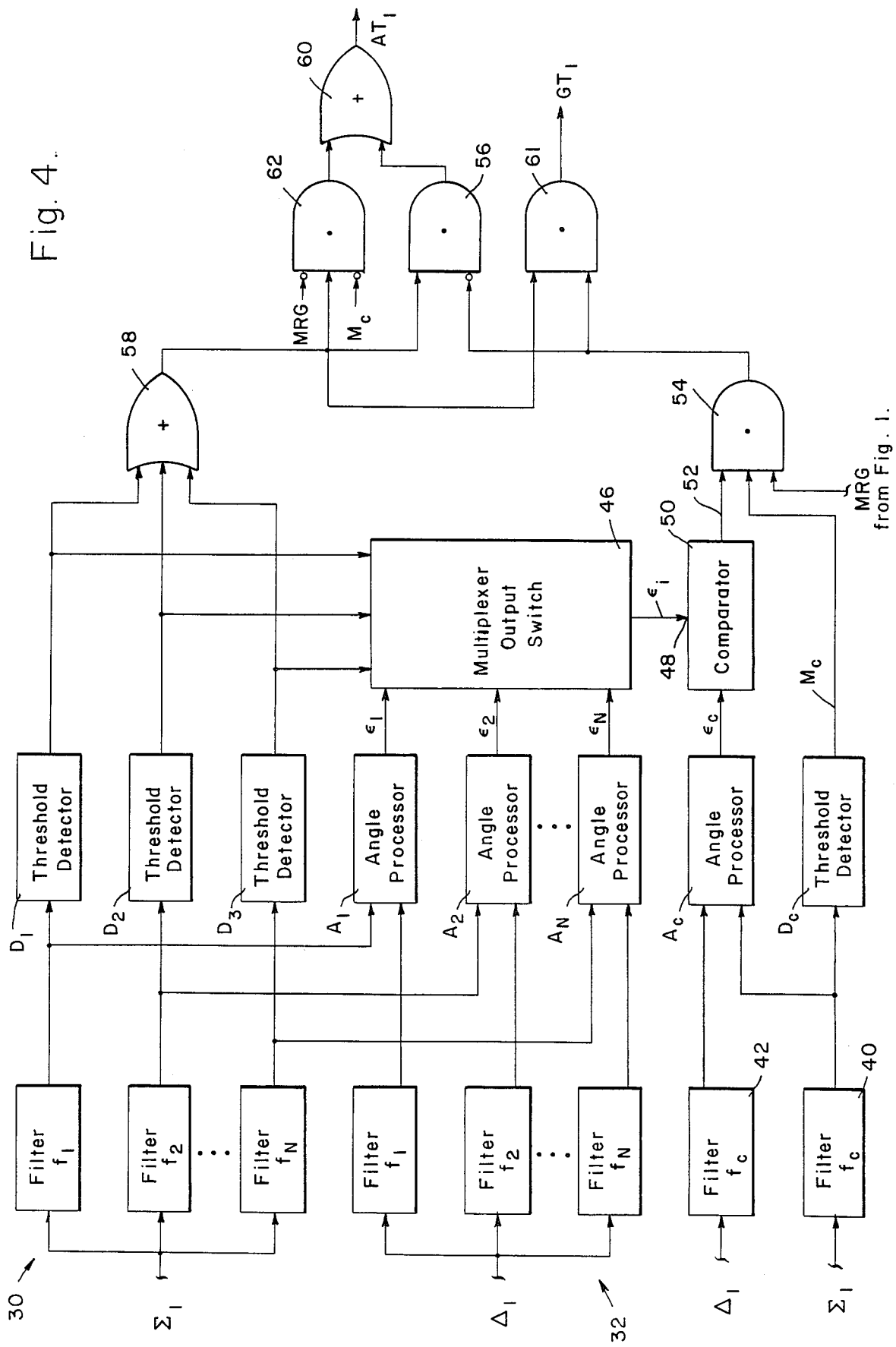
FIGS. 4 and 5 are block diagrams of two respective embodiments of processors in accordance with the subject invention.

As shown in FIG. 4, the sum monopulse received signal from the first range bin ($\Sigma_1$) is applied in parallel to a bank of doppler filters 30 which comprise a plurality of passband filters designated $f_1$ through $f_N$. The frequency response of these filters is selected so that they encompass the clutter free spectral zone of the received signal as is common in the doppler target detection art. For example, referring momentarily to FIG. 2 the portion of the diagram designated by reference numeral 33 would represent the received energy reflected from the ground i.e. clutter; and between the clutter spectral responses is the frequency zone in which moving targets, such as 35, may be detected. The portion of the frequency zone which is passed by filter $f_1$ is indicated by a rectangle 34 in FIG. 2; the portion of the spectrum passed by filter $f_2$ by a rectangle 36; and the portion of the spectrum passed by filter $f_N$ by rectangle 38.

Again referring primarily to FIG. 4, the output signal from each of the filters of bank 30 are applied to a plurality of threshold detectors which are designated by the reference letter D with a subscript corresponding to the subscript of the associated driving filter, for example, threshold detector $D_1$ is driven by the output signal from filter $f_1$ of bank 30. The output signals from the filter bank 30 are also applied to a plurality of angle measurement circuits which are designated by the letter A with a subscript corresponding to the subscript of the driving filter.

The monopulse elevation difference signal is applied to a bank of filters 32 comprising a plurality of doppler passband filters substantially identical to those of filter bank 30. For example, the filter designated $f_1$ in bank 32 has the same frequency passband as does the filter $f_1$ of bank 30. The output signals from filter bank 32 are applied as second inputs to the angle measurement circuits $A_1$ through $A_N$. For example, the output signal from filter $f_1$ of bank 30 and the output signal from filter $f_1$ of bank 32 are applied to angle measurement circuit $A_1$; and the output signal from filter $f_N$ of filter bank 30 and the signal from filter $f_N$ of bank 32 are applied to angle measurement circuit $A_N$.

The sum monopulse signal $\Sigma_1$ is also applied through a clutter passband filter 40 to an angle measurement circuit $A_C$; and the monopulse elevation difference signal $\Delta_1$ is passed through a filter 42 to a second input of the angle measurement circuit $A_C$. The frequency response of filters 40 and 42 is illustrated by a rectangle 44 in FIG. 2.

Angle measurement circuits $A_1$ through $A_N$ and $A_C$ may be implemented in accordance with techniques well known in the radar processing art. For example, the circuits could include circuits for phase detecting the sum signal ($\Sigma_1$) with respect to itself; phase detecting the elevation difference signal ($\Delta_1$) with respect to the sum signal; and for the dividing the elevation phase detector signal against the sum phase detected signal to provide an indication of the angle ($\epsilon$) of the target relative to the antenna boresight line. It is noted that the phase detection provides the sense of the angle from boresight inasmuch as the phase detected elevation difference signal is positive or negative depending on whether the target is above or below the antenna boresight line.

The output signals of angle measuring circuits $A_1$ through $A_N$, e.g. $\epsilon_1$, $\epsilon_2$ and $\epsilon_N$, are applied to a multiplexer output switch 46; and the output signals from threshold detectors $D_1$ through $D_N$ are applied as control signals to switch 46. If a moving target is detected by anyone of the threshold detectors, the corresponding angle signal $\epsilon_1$ is applied through switch 46 to a comparator 50. For example, if a target is detected within detector $D_1$ then the angle signal $\epsilon_1$ from angle processor $A_1$ is applied through switch 46 to an input 48 of comparator 50. The notation $\epsilon_i$ stands for any selected one of the angle signals $\epsilon_1, \epsilon_2 \ldots \epsilon_N$. If a target is detected in more than one of the filters of bank 30, multiplexers switch 46 sequentially applies the corresponding angle signals to comparator 50.

A signal $\epsilon_C$ which is indicative of the angle of the ground return (clutter) is applied as a second input signal to comparator 50; and an output signal is applied from comparator 50 on a lead 52 if the two applied angle signals are substantially equal. Comparator 50 could include circuits for subtracting the angle signal $\epsilon_i$ from $\epsilon_C$ and providing an output signal if the absolute value of the differences is less than a preselected threshold value. Comparator 50 could comprise, for example, a subtractor followed by a "window" detector.

The output signal from comparator 50 is applied as one input to an AND gate 54. A second input to AND gate 54 is provided from threshold detector $D_C$ and a third input is the main lobe range enabling gate (MRG) applied from computation circuit 22 of FIG. 1. The output signal from AND gate 54 is applied to an inverting input terminal of a gate 56 and the second input to gate 56 is applied from the output of an OR gate 58. Gate 58 combines the output signals from detectors $D_1$ through $D_N$ and hence its output is high if a moving target is detected in any of the doppler filters of bank 30. For the embodiment of FIG. 4, an airborne moving target ($AT_1$) is indicated at the output of an OR gate 60 if a moving target is detected within threshold detectors $D_1$ through $D_N$; if the output signal from comparator 50 indicates that the moving target is not at the same angle as the ground clutter signal; if the output from threshold detector $D_C$ indicates that a clutter signal is present and if the main lobe range enabling gate applied to gate 54 indicates that the range zone is within the range interval that encompasses the intersection of the main lobe with the ground. The implementation of gate 54 with the output signal from threshold detector $D_C$ and with the main lobe range engaging gate reduces the possibility of responding to an angle comparison in the absence of a ground return signal. However, it is noted that the just two mentioned processing features are to some extent redundant; further, one or both features could be deleted in many applications of the present invention.

Still referring primarily to FIG. 4, a gate 62 has one input terminal coupled to the output of OR gate 58, the main lobe range enabling gate signal applied to an inverting input terminal thereof and the output signal from threshold detector $D_C$ applied to a second inverting input terminal. For the situation in which there is no received clutter energy as indicated by the signals MRG and $M_C$ being low, then an airborne moving target is indicated if any moving target is detected by threshold detectors $D_1$ through $D_N$ and a signal indicative thereof is coupled through OR gate 58, gate 62 and OR gate 60. The rationale for declaring any moving target an airborne moving target in the just described situation is that if no ground clutter signal is received then any moving target must be airborne; and as a double check if the main lobe range enabling gate indicates that there is no intersection of the beam with ground at the given range interval being processed again any moving target has to be an airborne moving target. As indicated above, the implementation of gate 62 with both the MRG and $M_C$ signal is a redundant type of implementation to insure against false alarms and either of both of these signals need not be implemented in given applications of the subject invention.

The output signal from OR gate 60 ($AT_1$) might be applied to a target processor and tracker unit and/or it could be applied to a display unit such as unit 18 as discussed hereinabove relative to FIG. 1.

When the output from gate 54 is high and a moving target is indicated by a high output signal from gate 58, AND gate 61 provides an output signal ($GT_1$) which is indicative of the detection of a ground moving target. The signal $GT_1$ may also be applied to a target processor or tracker unit and/or displayed by unit 18 in a manner similar to that described above relative to the airborne moving target signal ($AT_1$).

Figure 5:
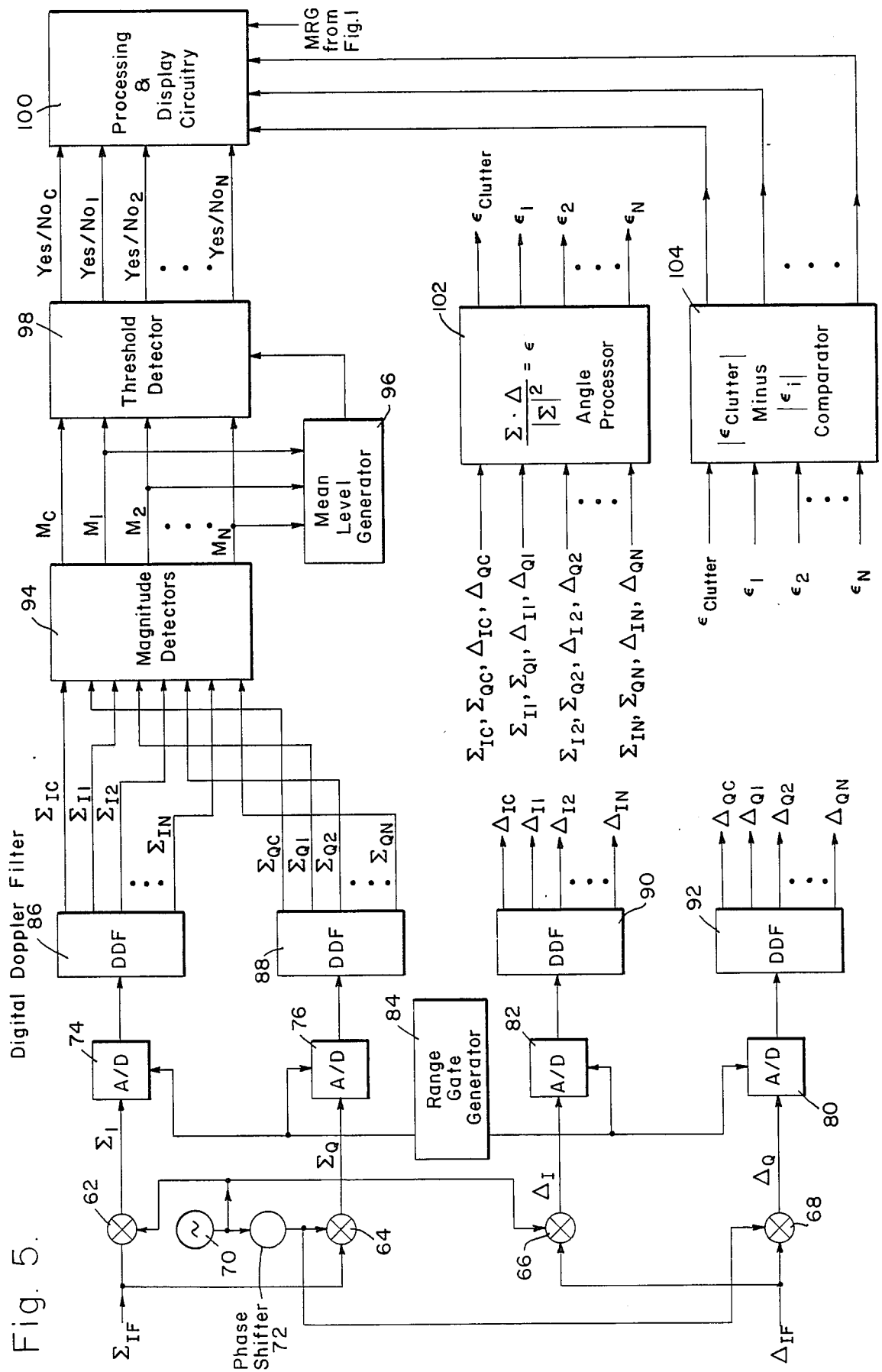

A second embodiment of the subject invention which is adapted for implementation by means of digital processors of the type incorporated in many present radar systems is shown in FIG. 5. In particular it is noted that the configuration of elements 62 through 98 shown in FIG. 5 may be part of the normal radar processor; and being well known in the art their operation will herein be only briefly summarized.

As shown in FIG. 5 the sum signal at an IF frequency is applied from the radar receiver 10 (FIG. 1) in parallel to mixers 62 and 64; and the elevation difference signal at an IF frequency is applied as the input signal to mixers 66 and 68. The output signal $f_o + \delta_v$ from an IF frequency source 70 is applied to mixers 62 and 66 and to a 90° phase shifting circuit 72. The output signal from phase shifting circuit 72 is applied to mixers 64 and 68. The signal $f_o + \delta_v$ is of such a frequency that the resultant video signal at the output of the mixers has the clutter energy at a preselected fixed frequency. Various circuits for providing the signal $f_o + \delta_v$ as a function of the doppler frequency resulting from the motion of the aircraft carrying the radar are well known in the art.

The output signal from mixer 62 is designated $\Sigma_I$ and is applied to an analog to digital (A/D) converter 74; the output signal from mixer 64 is designated as $\Sigma_Q$ and is applied to an A/D converter 76. Similarly the output signal from mixer 66 designated $\Delta_I$ is applied to an A/D converter 78 and the output from mixer 68 designated $\Delta_Q$ is applied to an A/D converter 80. The subscripts I and Q designate the inphase and quadrature components of the signal respectively.

A/D converters 74, 76, 80 and 82 are controlled in response to output pulses from a range gate generator 84, and their output signals are applied to digital doppler filters 86, 88, 90 and 92 respectively. It is noted that the implementation of the digital doppler filters is well known in the art and in some applications these filters would be implemented as part of the associated radar system and no additional expense would be involved to use them as part of the subject invention.

Although in response to the output signals from the analog-to-digital converters the digital doppler filters sequentially provide output signals for each of the range bins being processed by the radar system, in the interest of clarity in the following description only the signals associated with the first range bin will be described. It will be understood that the data from the remaining range bins is processed in an identical manner. The doppler filters 86, 88, 90 and 92 each implement a plurality of narrow passband filters which are similar in function to those discussed hereinabove relative to the embodiment of FIG. 4 and which were explained relative to FIG. 2. For example, digital doppler filter 86 provides an inphase filtered sum signal which corresponds to the frequency of the clutter signal, on a first output lead as well as output signals corresponding to doppler moving target filters 1 through N. Digital doppler filter 88 provides the same functional implementation for the quadrature component of the sum signal; and digital doppler filters 90 and 92 provide corresponding signals for the inphase and quadrature components, respectively, of the elevation difference signal.

The corresponding inphase and quadrature components from the various filters formed by units 86 and 88 are combined in magnitude detectors 94. For example, the signal $\Sigma_{IC}$ is squared and summed with the square of the signal $\Sigma_{QC}$ and the square root of the resultant sum is applied as the output signal $M_C$ from magnitude detector unit 94. The signal $M_C$ is indicative of the magnitude of the received sum energy which is within the passband of the clutter filter. Similarly the output signals $M_1$ through $M_N$ represent the magnitude of the sum signals from respective moving target filters.

Output signals $M_1$ through $M_N$ are processed in a mean level generator 96 in accordance with techniques well known in the art for providing a mean threshold level; and this threshold level is used to control threshold detector 98. The output signals from threshold detector 98 are indicative of received energy detected within the clutter filter or within any of the moving target filters 1 through N.

An angle processor 100 responds to the output signals from digital doppler filters 86, 88, 90 and 92 to provide a plurality of output signals which are indicative of the angles of signals detected within the corresponding filters.

The output signals from threshold detector 98 are indicative of whether or not the magnitude of the output from the clutter filter and each of the moving target detection filters exceed a mean level threshold and these signals are applied in parallel to processing and display circuitry 100.

The output signals from digital doppler filters 86, 88, 90 and 92 are applied to an angle processor 102 wherein the angle of the ground returns $\epsilon_c$ and the angle of each of the moving target signals $\epsilon_1, \epsilon_2 \ldots \epsilon_N$ are computed in accordance with the equation $\Sigma_i \cdot \Delta_i / |\Sigma|^2 = \epsilon_i$. The just outlined angle computation is well known in the art, for example, it is used extensively for the implementation of terrain avoidance and terrain following radar modes.

The output signals from processor 102 are compared within comparator unit 104 which implements the equation $|\epsilon_c - \epsilon_i| \leq X$. If the difference between the angle of the ground return signal and that of a moving target is less than a preselected threshold value (X) the target is considered to be at the same angle as the ground. An output signal which is indicative of whether each moving target is at the same angle as the ground return signals is applied from comparator 104 to display processors circuitry 100.

Circuitry 100 logically processes the output signals from threshold detector 98 and comparator 100 to make the final determination as to whether a target is moving on the ground or in the air. For example, if the clutter signal $M_C$ is below the threshold level as indicated by the signal on lead 99 and if the range bin being processed is not within the main lobe range enabling gate (MRG) then all moving targets detected by threshold detector 98 are determined to be airborne moving targets. However, if the signal on lead 99 and the main lobe range enabling gate indicates that a ground return signal is present at the range bin being processed then the determination as to whether a target is a ground or an airborne target is made in response to the output signals from comparator 104. For example, if the angle $\epsilon_1$ is approximately equal to the angle $\epsilon_C$ then the target detected in filter $f_1$ is determined to be a ground moving target; while if the angle $\epsilon_2$ is substantially different from the angle $\epsilon_C$ then a target detected in filter $f_2$ is determined to be an airborne moving target.

Thus having described a new and improved moving target detection system adapted for distinguishing airborne from ground moving targets, what is claimed is:

1. A processor adapted for use in conjunction with a radar system and being responsive to range gated received energy provided thereby, for discriminating between ground and airborne moving targets, said processor comprising:
   thresholding means, responsive to received energy from a given range internal, for providing output signals indicative of detected moving targets;
   angle measurement means, responsive to the received energy from said given range interval, for providing output signals indicative of the relative angle to each of said moving targets and to the ground; and
   logic means, responsive to the output signals from said thresholding means and said angle measurement means, for providing signals indicative of whether detected moving targets are ground or airborne moving targets, as a function whether or not respectively, the relative angles to said detected moving targets are substantially the same as the relative angle to the ground.

2. The processor of claim 1 wherein said radar system is a monopulse radar system adapted for providing sum and elevation difference signals; said thresholding means is coupled to receive said sum signal and is responsive thereto so as to provide said signals indicative of detected moving targets; and said angle measurement means is coupled to receive said sum and elevation difference signals and is responsive thereto so as to provide said signals indicative of the relative angle to each of said moving targets and to the ground.

3. The processor of claim 1 further comprising means for providing a clutter output signal indicative of received energy within a frequency range which encompasses the frequency zone of signals resulting from radar returns from the ground; and said angle measurement means includes means, responsive to said clutter output signal, for providing said signal indicative of the angle to the ground.

4. The processor of claim 3 wherein said thresholding means includes means for responding to said clutter output signal for providing a clutter presence signal if the clutter output signal is above a threshold value; and said logic means includes means for providing a signal indicative of an airborne moving target for all moving targets detected during the absence of said clutter present signal.

5. The processor of claim 1 wherein said radar system includes means for providing a main lobe range gate signal indicative of the range zone within which the transmitted radar beam intersects the ground; and said logic means includes means for providing a signal indicative of an airborne moving target for all moving targets detected at ranges not encompassed by said main lobe range gate signal.

6. A processor adapted for use in conjunction with a radar system and being responsive to range gated received energy provided thereby, for discriminating between ground and airborne moving targets as a function of the relative angles from the radar system to said targets, said processor comprising:

filter means, responsive to received energy from a given range interval, for providing output signals indicative of the energy in each of a plurality of respective frequency ranges which include the frequency zone of signals resulting from moving targets;

thresholding means, coupled to said filter means, for providing output signals indicative of the detection of energy from a moving target within said respective frequency ranges;

angle measurement means, coupled to said filter means, for providing moving target angle signals indicative of the relative angle of said moving targets; and for providing a ground angle signal indicative of the relative angle of the ground;

comparator means for comparing said moving target angle signals with said ground angle signal and for providing output signals indicative of whether said moving target angle signals are substantially the same as or different from said ground angle signal; and logic means for responding to the output signals from said thresholding means and said comparator means for providing signals indicative of whether moving targets detected by said thresholding means are ground or airborne moving target, as a function of whether or not respectively, the output signals from said comparator means indicate that said moving target angle signals are substantially the same as said ground angle signal.

7. The processor of claim 6 wherein said filter means includes means for providing a clutter output signal indicative of received energy from said given range interval within a frequency range which encompasses the frequency zone of signals resulting from radar returns from the ground; and said angle measurement means includes means for responding to said clutter output signal for providing said ground angle output signal.

8. The processor of claim 6 wherein said radar system is a monopulse radar system adapted for providing received sum and elevation difference signals; said filter means includes means for passband filtering both said sum and elevation difference signals for said given range interval so as to provide a plurality of output signals indicative of the received energy in each of said plurality of frequency ranges; and said angle measurement means includes means, responsive to the filtered sum signal and elevation difference signal from respective one of said frequency ranges, for providing said moving target angle signals.

9. The process or claim 8 wherein said filter means includes means for providing filtered clutter output signals indicative of the energy for said given range interval in said sum and elevation difference signals, respectively, which is in the frequency zone of signals resulting from radar returns from the ground; and said angle measurement means includes means, responsive to said filtered clutter output signals, for providing said ground angle signal.

10. The process of claim 7 wherein said thresholding means includes means, responsive to said clutter output signal, for providing a clutter present signal if the clutter output signal is above a threshold value, and said logic means includes means for providing a signal indicative of an airborne moving target for all moving targets detected during the absence of said clutter present signal.

11. The processor of claim 7 wherein said radar system includes means for providing a main lobe range gate signal indicative of the range zone within which the transmitted radar beam intersects the ground; and said logic means includes means for providing a signal indicative of an airborne moving target for all moving targets detected at ranges not encompassed by said main lobe range gate signal.

12. The processor of claim 7 wherein said thresholding means includes means, responsive to said clutter output signal for providing a clutter present signal if the clutter output signal is above a threshold value; said logic means includes means for providing a signal indicative of an airborne moving target for all moving targets detected during the absence of said clutter present signal; said radar system includes means for providing a main lobe range gate signal indicative of the range zone within which the transmitted beam intersects the ground; and said logic means includes means for providing a signal indicative of an airborne moving target for all moving targets detected at ranges not encompassed by said main lobe range gate signal.

13. The processor of claim 6 wherein said filter means, thresholding means and angle measurement means comprise digital processing circuits.

* * * * *